United States Patent [19]

Bott

[11] 4,269,339

[45] May 26, 1981

[54] LUGGAGE CARRIER WITH ILLUMINATING MEANS

[76] Inventor: John A. Bott, 931 Lakeshore Dr., Grosse Pointe Shores, Mich. 48236

[21] Appl. No.: 33,897

[22] Filed: Apr. 27, 1979

[51] Int. Cl.³ ............................................. B60R 9/04
[52] U.S. Cl. ................................ 224/325; 224/309; 224/324; 362/73
[58] Field of Search ............... 224/309, 321, 324, 325, 224/326, 329; 362/73, 82

[56] References Cited

U.S. PATENT DOCUMENTS

| | | | |
|---|---|---|---|
| 2,217,688 | 10/1940 | Larson et al. | 362/73 |
| 2,843,729 | 7/1958 | Materese | 362/73 |
| 3,375,365 | 3/1968 | Gross | 362/73 |
| 3,460,728 | 8/1969 | Adamson | 224/42.1 |
| 3,519,180 | 7/1970 | Bott | 224/42.1 |
| 3,779,436 | 12/1973 | Burland | 224/42.1 G |
| 3,789,358 | 1/1974 | Ellis | 340/87 |
| 4,114,789 | 9/1978 | Blaylock et al. | 224/42.1 E |
| 4,170,323 | 10/1979 | Helm | 224/309 |

*Primary Examiner*—Steven M. Pollard
*Attorney, Agent, or Firm*—Harness, Dickey & Pierce

[57] ABSTRACT

An automobile luggage carrier having spaced side members and spaced cross members in which the carrier is supported at the front and rear corners on stanchions and in which the stanchions form part of the carrier and are firmly secured to the roof of an automobile and including illuminating means provided in certain or all of the stanchions to illuminate the area of the carrier and facilitate its use in the dark. Such illumination, either direct or reflective, would be highly visable to oncoming traffic and would contribute to the safe loading or unloading of the carrier in the dark.

7 Claims, 4 Drawing Figures

U.S. Patent   May 26, 1981   4,269,339
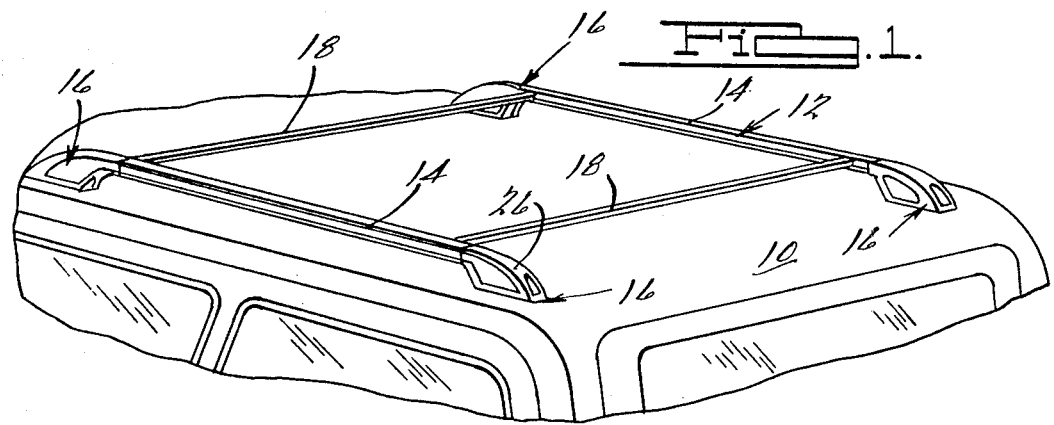
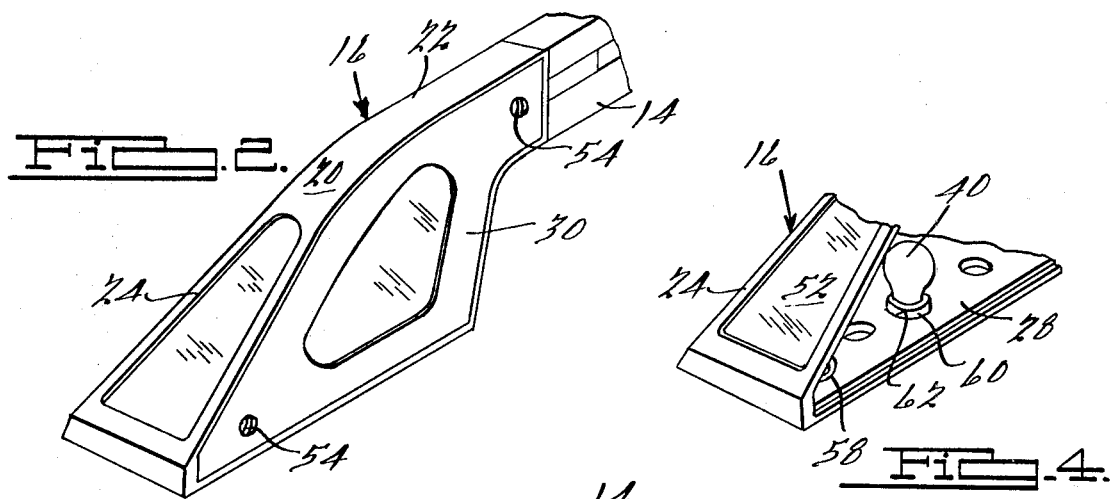
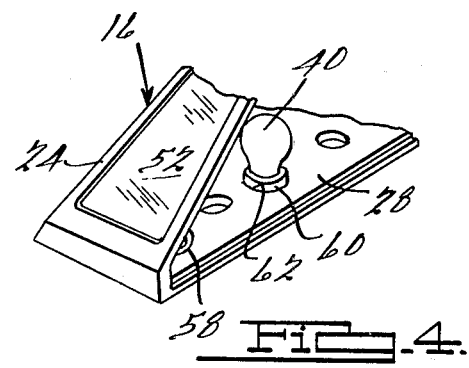
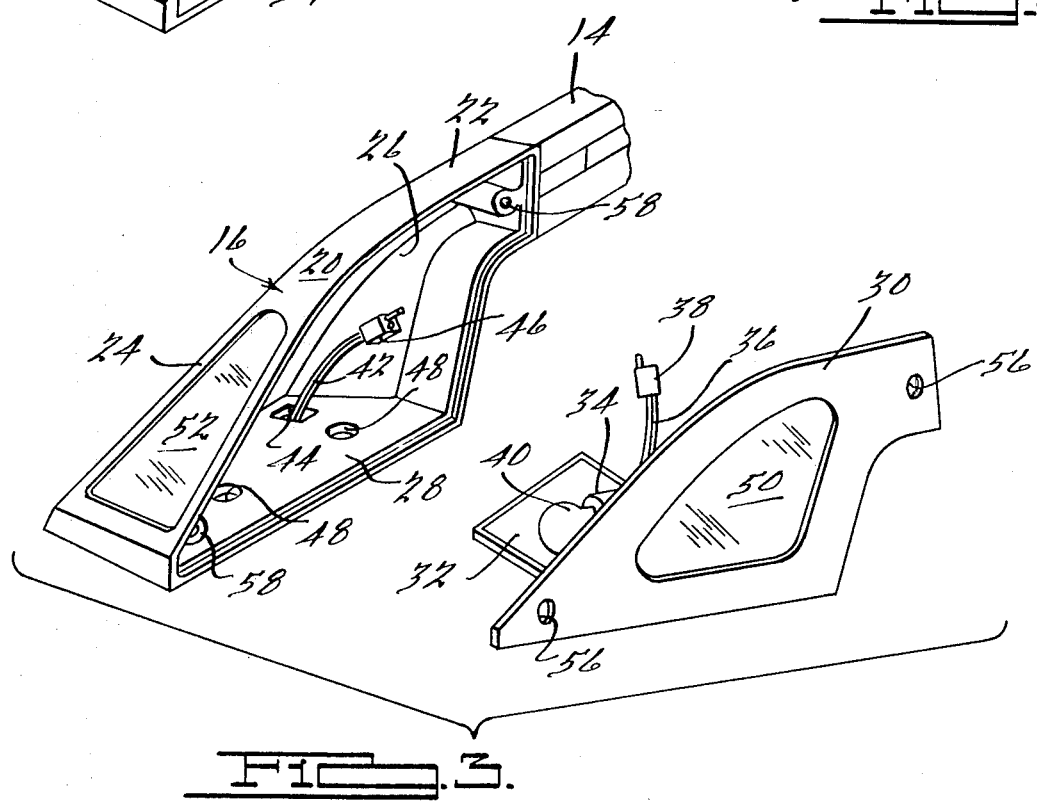

LUGGAGE CARRIER WITH ILLUMINATING MEANS

BACKGROUND OF THE INVENTION

Luggage carriers or racks have long been used on outer surfaces of automotive vehicles for carrying many different types of articles which are secured to the carrier in one way or another. However, none are known which include illuminating means, either reflective or direct, as a part of the carrier itself. A search of the prior patents failed to reveal any. Lights on the tops of vehicles are known, such as those on emergency vehicles.

SUMMARY OF THE INVENTION

According to the present invention, illuminating means, either direct or reflective, or both, are disposed in the stanchions of the carrier which secure the carrier to the roof. In the preferred form of the invention electric light bulbs are disposed inside the stanchions, connected to the electrical system of the vehicle and operated by a conventional switch conveniently located within the vehicle. Transparent windows are disposed in the inner faces of the stanchions facing inwardly of the carrier so that the entire area of the carrier may be illuminated in the dark. Further, reflective light sources are disposed in the end edges of the stanchions. Thus the entire area of the carrier may be illuminated in the dark not only facilitating the loading and unloading of the carrier but also serving as a signal to oncoming traffic and protecting the user against accidents.

The luggage carrier per se by way of illustration may be like that shown in J. A. Bott U.S. Pat. No. 3,519,180, granted July 7, 1976. However, the invention may be used with other known forms of luggage carriers as will be apparent to those skilled in the art.

BRIEF DESCRIPTION OF THE DRAWINGS

FIG. 1 is a perspective view of the upper portion of a vehicle body having a luggage carrier mounted thereon which incorporates the illuminating stanchions of the present invention.

FIG. 2 is a perspective view toward the inside surface and the end edge of one of the stanchions of the present invention.

FIG. 3 is a separated, perspective view of the stanchion shown in FIG. 2 with the inner face of the stanchion removed and showing the electrical connection for the light bulb mounted therein.

FIG. 4 is a partial view similar to FIG. 3 of a modified form of electric light bulb mounting.

DETAILED DESCRIPTION OF THE PREFERRED EMBODIMENT

Referring to the drawings and particularly to FIG. 1, an automotive vehicle 10 is shown having a luggage carrier 12 mounted on the horizontal roof portion thereof. The luggage carrier 12 is shown by way of illustration as that disclosed in Bott U.S. Pat. No. 3,519,180. The carrier 12 embodies side rails or members 14 arranged parallel and extending longitudinally of the body 10. The opposite ends of the side rails 14 are supported on stanchions 16. A pair of cross members 18 extend transversely between the side rails 14 adjacent the forward and rearward ends of the carrier 12.

The stanchions 16 are specially constructed for combination with the carrier 12 to provide illumination for the entire carrier area. The preferred embodiment is illustrated in FIGS. 2 and 3 and a modified embodiment is illustrated in FIG. 4.

Referring to FIGS. 2 and 3, each stanchion 16 comprises a hollow casing 20 having a top 22, a rear sloping surface 24, a closed outer wall 26, a bottom 28 and a removable inner wall 30.

The inside face of the wall 30 has a projecting shelf 32 fixed adjacent the lower edge thereof. The shelf serves to support a bulb socket 34 mounted on a bracket thereon with electric wires 36 projecting therefrom having a plug connector 38 at the ends thereof. An electric light bulb 40 is removably disposed in the socket 34.

Electric wires 42, suitably connected to the electric system of the vehicle extending through an opening in the roof and an opening 44 in a corner of the base 28. The wires 42 have a plug connector 46 connected to the ends of the wires 42 which is adapted to plug into the cooperating and interfitting connector 38 to complete the electric circuit to the bulb 40 when the wall 30 is mounted on the casing 20.

The stanchions 16 are secured to the vehicle top by screws (not shown) which pass through openings 48 in the base 28 and are screwed into underlying holes in the vehicle top.

The side 30 is formed with a transparent window 50 of glass or plastic.

The rear sloping wall 24 has a reflector 52 mounted thereon such reflector being of a selected, colored reflecting material and construction so that the vehicle is readily visable to oncoming traffic.

The side 30 is removably secured to the casing 20 by screws 54 which pass through openings 56 in the casing and into cooperating screw sockets 58 in the casing.

Referring to FIG. 4, a modified way of mounting the light bulb 40 is illustrated. In this embodiment a bulb socket assembly 60 is mounted on the roof of the vehicle and projects above the roof. The assembly 60 is electrically connected to the electric system of the vehicle through suitable lead wires. The assemblies 60 are positioned so that when the stanchions 16 and the carrier 12 are mounted on the vehicle roof the assemblies 60 will project through aligned openings 62 in the bases 28 of the stanchions.

The shelf 32 and the bulb mountings 34 of the prior embodiment FIGS. 2 and 3 are dispensed with the inner cover or wall 30 is applied as above described.

In both embodiments and with the stanchions assembled and the bulbs 40 lit, light is projected over the entire carrier area as well as being projected beyond the car top so that plenty of illumination is provided to aid and protect the one loading or unloading the carrier. The reflectors 52 aid in protecting the user from being struck by oncoming traffic.

While the more illumination the better and therefore having all four stanchions illuminated is preferred, it is not necessary within the broad scope of the invention. For example, only the front pair, or the back pair, or one or the other of the side pairs may be illuminated within the scope of the invention as set forward in the claims.

Formal changes may be made in the specific embodiments of the invention illustrated without departing from the spirit of the invention the scope of which is set forth in the appended claims.

I claim:

1. A luggage carrier mounted on a substantially horizontal surface of an automotive vehicle, said carrier including spaced side members and spaced cross members, stanchions located at at least two corners of the carrier securing the carrier to the vehicle surface, an interior area formed between said stanchions, and illuminating means provided in at least one of said stanchions to illuminate said interior area.

2. A luggage carrier according to claim 1 in which said illuminating means is provided in all stanchions.

3. A luggage carrier according to claim 1 in which stanchions are provided in four corners of the carrier and in which illuminating means are provided in all stanchions.

4. A luggage carrier according to claim 3 in which transparent windows are provided in the inner faces of said stanchions and in which electric illuminating means are provided in each stanchions direct light through said windows and over said carrier.

5. A luggage carrier mounted on a substantially horizontal outer surface of an automative vehicle, said carrier including:
- a plurality of stanchions securing the carrier to the vehicle outer surface forming an interior area between the stanchions;
- at least one luggage constraining rail secured between two of said stanchions;
- illuminating means located in at least one of said stanchions and directed towards said interior area to illuminate said interior area; and
- means for protecting said illuminating means from environmental effects comprising translucent window means.

6. A claim in accordance with claim 5, wherein said stanchion in which said illuminating means is located has a casing portion and a separable side portion, and said illuminating means and said translucent window means are connected to said separable side portion.

7. A claim in accordance with claim 5, wherein said luggage carrier comprises four stanchions and four of said luggage constraining rails comprising two siderails and two crossrails.

* * * * *